(12) United States Patent
Gunti et al.

(10) Patent No.: US 10,013,453 B2
(45) Date of Patent: Jul. 3, 2018

(54) EFFICIENT MANAGEMENT OF LARGE NUMBER OF FILE DESCRIPTORS

(71) Applicant: VMware, Inc., Palo Alto, CA (US)

(72) Inventors: Mukund Gunti, Mountain View, CA (US); Joe A. Landers, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 425 days.

(21) Appl. No.: 14/746,695

(22) Filed: Jun. 22, 2015

(65) Prior Publication Data

US 2016/0371322 A1 Dec. 22, 2016

(51) Int. Cl.
*G06F 17/00* (2006.01)
*G06F 17/30* (2006.01)

(52) U.S. Cl.
CPC .... *G06F 17/30377* (2013.01); *G06F 17/3012* (2013.01); *G06F 17/30362* (2013.01)

(58) Field of Classification Search
CPC ......... G06F 17/30339; G06F 17/30171; G06F 17/30362; G06F 17/3048; G06F 3/0619; G06F 3/067; G06F 3/0683; G06F 11/1435
USPC ................. 707/694, 794, 769, 704, 999.001; 711/133, 162; 709/241, 133, 162
See application file for complete search history.

(56) References Cited

U.S. PATENT DOCUMENTS

| | | | |
|---|---|---|---|
| 5,809,527 A * | 9/1998 | Cooper | G06F 12/0866 707/999.2 |
| 8,645,568 B2 * | 2/2014 | Patterson | H04L 45/02 709/240 |
| 9,164,702 B1 * | 10/2015 | Nesbit | G06F 3/067 |
| 2006/0056803 A1 * | 3/2006 | Seo | G11B 27/105 386/314 |
| 2009/0271581 A1 * | 10/2009 | Hinrichs, Jr. | G06F 11/1441 711/162 |
| 2012/0310909 A1 * | 12/2012 | Vaghani | G06F 17/00 707/704 |
| 2014/0254598 A1 * | 9/2014 | Jha | H04L 45/74 370/392 |

* cited by examiner

*Primary Examiner* — Dung K Chau
(74) *Attorney, Agent, or Firm* — Patterson & Sheridan, LLP (57) ABSTRACT

A file descriptor data structure is configured as a hierarchy of tables. File descriptors are stored as entries in tables that are at the bottom of the hierarchy. When a request to add a file descriptor is received and there are no more entries remaining in the file descriptor tables, the file descriptor data structure is extended by obtaining a lock on a variable containing a maximum number of file descriptors, adding the file descriptor to a new file descriptor table, updating entries in existing upper level tables of the hierarchy so that they point to the new file descriptor table, updating the variable containing the maximum number of file descriptors, and releasing the lock.

20 Claims, 6 Drawing Sheets

EFFICIENT MANAGEMENT OF LARGE NUMBER OF FILE DESCRIPTORS

BACKGROUND

An essential aspect of an operating system, such as Unix or Linux, is the management and support of processes and threads. These operating systems can have a large number of active processes and many threads for each process, which can lead to a very large number of open files attached to those processes or threads. In some cases, 30,000 to a million files could be open for a process. Managing the open files requires allocating and maintaining file descriptors for each of the open files.

Operating system performance demands that there be an efficient way to generate a large number of file descriptors and an efficient way to find a file descriptor. One solution is to allocate at boot time a static list of file descriptors, where the list has the maximum number of file descriptors ever needed by each process or its threads after the operating system is running. While such a system might support fast lookups, it would require a very large amount of dedicated memory and thus is not feasible.

SUMMARY

Embodiments provide an efficient method of managing a large number of file descriptors using a data structure for file descriptors that is set up per process. The data structure is configured as a table hierarchy that grows as needed. The data structure is grown by obtaining a lock, extending the table hierarchy, and then releasing the lock. Access to the data structure to find a file descriptor includes traversing the table hierarchy until the sought for descriptor is found. The process of finding and reading the file descriptor does not require a lock and takes a constant amount of time. As used herein, a "file descriptor" is used as a term for a descriptor of a data file as well as other entities that are managed as files, such as pipes and sockets, in operating systems such as Unix and Linux.

One embodiment provides a method for adding file descriptor data in a memory-resident data structure for storing file descriptors for a process, where the data structure includes a root table and a descriptor table that is accessed through an entry in the root table. This method includes the steps of: receiving a request from a thread of a process to add a file descriptor to the memory-resident data structure, and obtaining a lock on a variable containing a value that represents a maximum number of descriptors for the process. While the lock is held, the file descriptor is added to a new file descriptor table. The method then updates the variable with an increased value to reflect an increase in the maximum number of file descriptors in the data structure for process, and releases the lock.

A file descriptor previously allocated may be read while the memory-resident data structure is being extended. This method includes the steps of: while the lock is held, receiving a request from another thread of the process to access a file descriptor in the memory-resident data structure, verifying that a file descriptor number contained in the request is less than a current value of the variable containing the maximum number of file descriptors for the process, and obtaining the requested file descriptor from one of the file descriptor tables using the file descriptor number.

One advantage of the embodiments is that the data structure grows only when new file descriptors are needed and the capacity of the existing structure has been exceeded. Thus, the data structure only allocates memory as needed. Another advantage of the embodiments is that the data structure allows multiple threads to access the data structure for a file descriptor regardless of whether or not the data structure is being updated. Still another advantage of the embodiments is that access to a file descriptor having a number less than a maximum number of file descriptors in the data structure is guaranteed.

DETAILED DESCRIPTION

Figure 1:
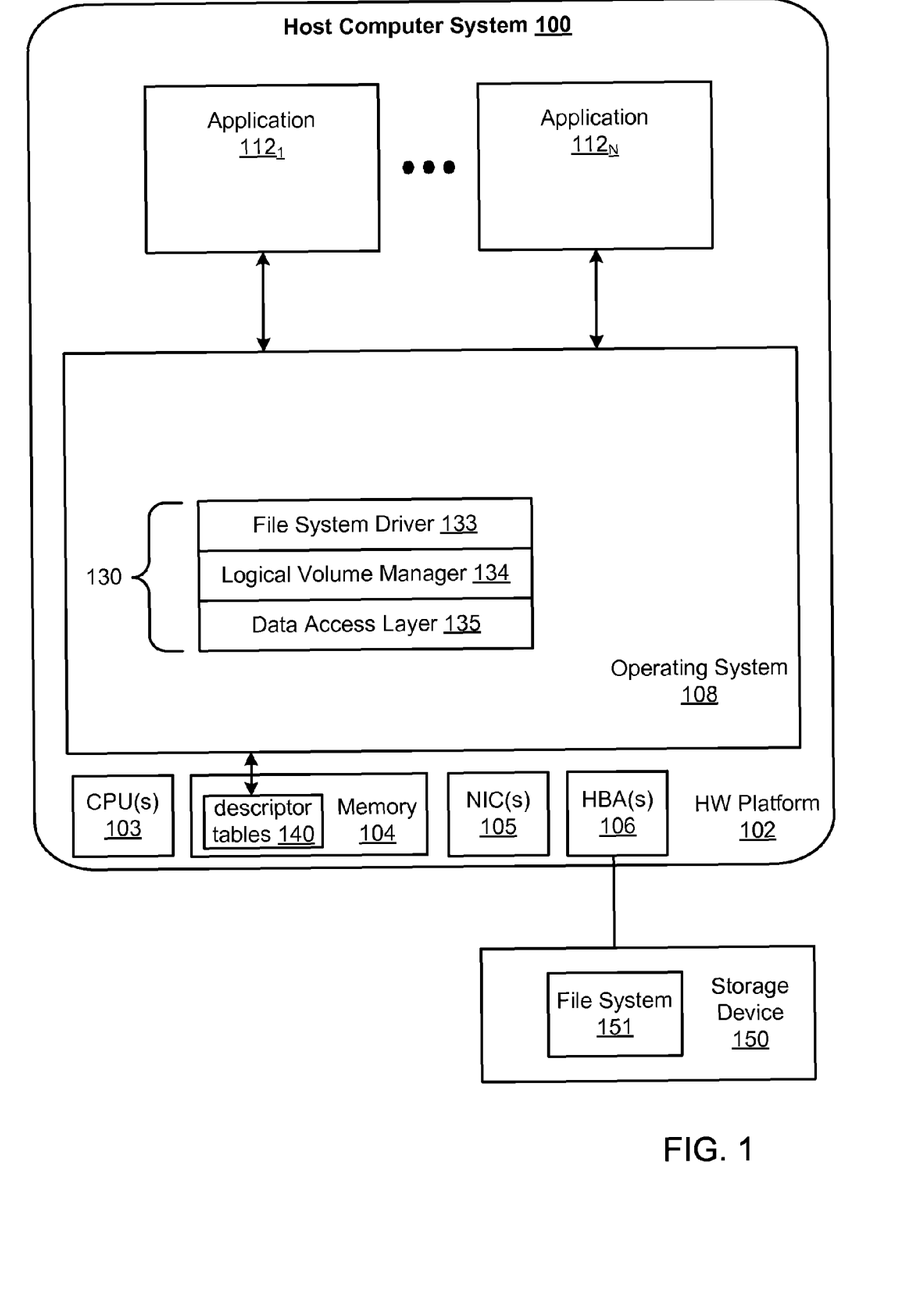
FIG. 1 depicts an example general purpose computer system suitable to run an operating system and file system.

FIG. 1 depicts a computer system, shown as host computer system 100, having an operating system 108 which includes a file system driver 133 for a storage system. Host computer system 100 may be constructed on a conventional, typically server-class, hardware platform 102, and includes one or more central processing units (CPUs) 103, system memory 104, one or more network interface controllers (NICs) 105 that connect host computer 100 to a network, and one or more host bus adapters (HBAs) 106 that connect host computer 102 to a persistent storage unit, illustrated herein as storage device 150. Alternatively, persistent storage may be provided locally in host computer 100 or through the network by a networked-attached storage device.

As further shown in FIG. 1, operating system 108 is installed on top of hardware platform 102 and supports the execution of applications $112_1$-$112_N$. In some embodiments, the operating system 108 may be a virtualization software layer that supports execution of virtual computing instances, such as virtual machines that include guest operating system and containers that do not, and applications 112 may be virtual computing instances. IOs issued by the applications are processed through IO stack 130 within the operating system 108. The IO stack 130 includes several layers managed by operating system 108. In IO stack 130, file system driver 133 receives the read IOs and write IOs and translates them to block IOs issued to one or more logical volumes that are provisioned in file system 151. These block IOs are processed by logical volume manager (LVM) 134, which generates raw SCSI commands from the block IOs and provides them to data access layer 135. Data access layer 135 includes a device access layer, which discovers storage device 150, and applies command queuing and scheduling policies to the raw SCSI commands, and a device driver, which understands the input/output interface of HBAs 106 interfacing with storage device 150, and sends the raw SCSI commands to HBAs 106 to be forwarded to storage device 150.

Execution of an application in the system of FIG. 1 is carried out by executing one or more processes. If a process requests that read or write operations be performed on a file in the file system 151, the process first opens the file by making an open call to the operating system 108. In executing the call, OS kernel 140 allocates a file descriptor, which in the embodiments described herein, take the form of an integer number that is incremented each time a new file descriptor is allocated, for the file and places the file descriptor in one of the per-process file descriptor tables 140 in memory 104, which tracks the file descriptors along with other information for each of the opened files within the process.

Figure 2:
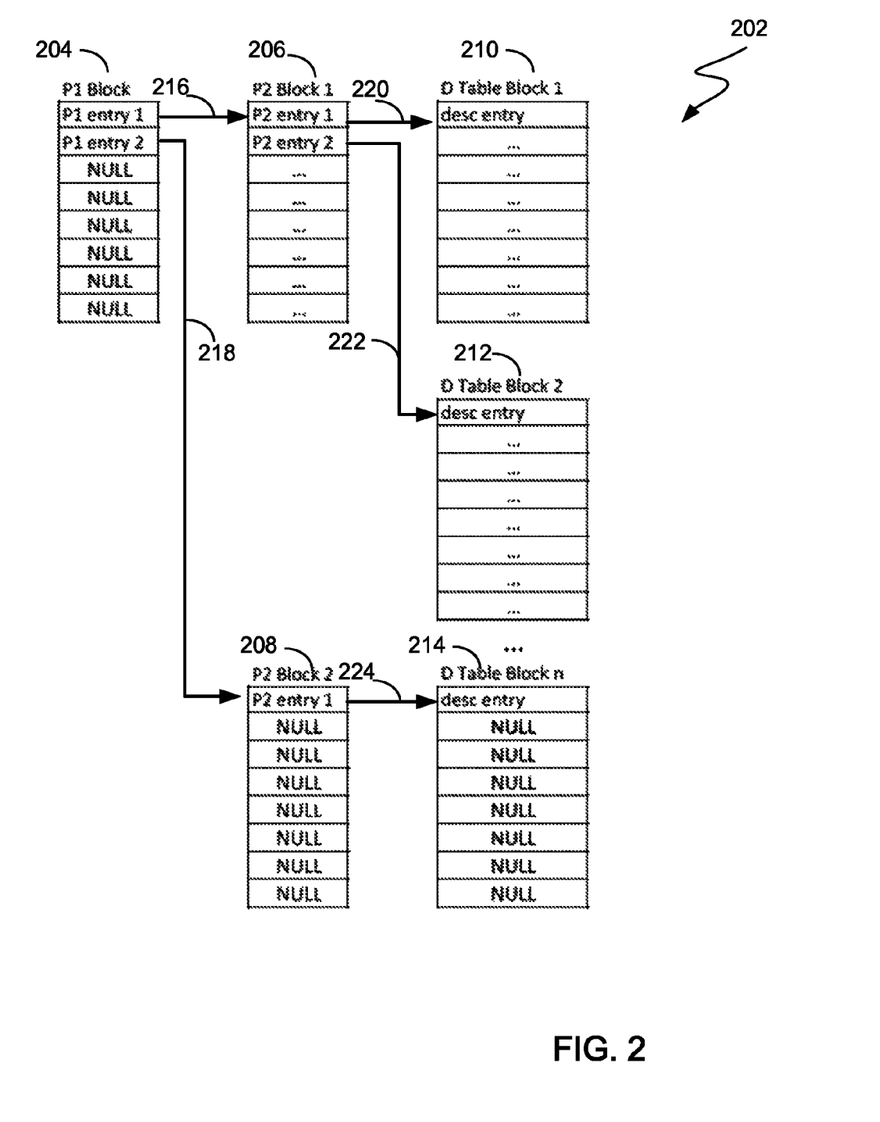
FIG. 2 depicts an example data structure according to an embodiment.

FIG. 2 depicts an example data structure 202 according to an embodiment. The example data structure is a three-level hierarchical table structure which includes a single root table, P1 Block 204, which is allocated as part of the process state. The root table has a fixed size that cannot be changed at runtime. The root table contains a list of entries, where each entry is a pointer pointing to one of second level tables. In the example depicted in FIG. 2, P1 Block 204 has two entries. The first entry points to the second level table, P2 Block 1 206, and the second entry points to the second level table, P2 Block 2 208. The remaining entries of P1 Block 204 are initialized but not populated and thus are indicated as NULL.

Each second level table also contains a list of entries, where each entry is a pointer pointing to one of third level tables, which are descriptor tables that contain file descriptors (DTable Block 1 210, DTable Block 2 212, . . . , DTable Block n 214). The size of each second level table is fixed and cannot be changed at runtime. In the example depicted in FIG. 2, the first entry in P2 Block 1 206 points to DTable Block 1 210 and the second entry in P2 Block 1 206 points to DTable Block 2 212. The remaining entries of P2 Block 1 206 point to other descriptor tables but are not shown in FIG. 2. In addition, the first entry in P2 Block 2 208 points to DTable Block n 214. The remaining entries of P2 Block 2 208 are initialized but not populated and thus are indicated as NULL.

Each third or bottom level table, i.e., each DTable Block, contains a fixed set of file descriptor entries. In one embodiment, a file descriptor includes the following data: a pointer to an object, such as a file, one or more locks to ensure data consistency, and one or more flags. The flags include an initialized flag and a taken flag. The initialized flag is used to indicate that the descriptor has been initialized. The taken flag is used to indicate that the entry has been reserved and cannot be used otherwise. The taken flag is set to FALSE when a process no longer needs the descriptor entry. If a taken flag is FALSE, then another process can reuse the slot in the DTable for its own descriptor.

Additionally, the OS kernel maintains a per-process (and thus per file descriptor data structure) variable, which can be stored in the per-process file descriptor data structure, that tracks the maximum number of file descriptors that can be supported. As the data structure is extended, this number is increased. This variable has an associated lock to ensure that only one of the threads of the process is permitted to update this variable any one time.

FIG. 2 illustrates an embodiment where the file descriptor data structure is a three-level hierarchical table structure. Other embodiments may employ any N-level hierarchical table structure, where N is an integer equal to greater than two.

Figure 3A:
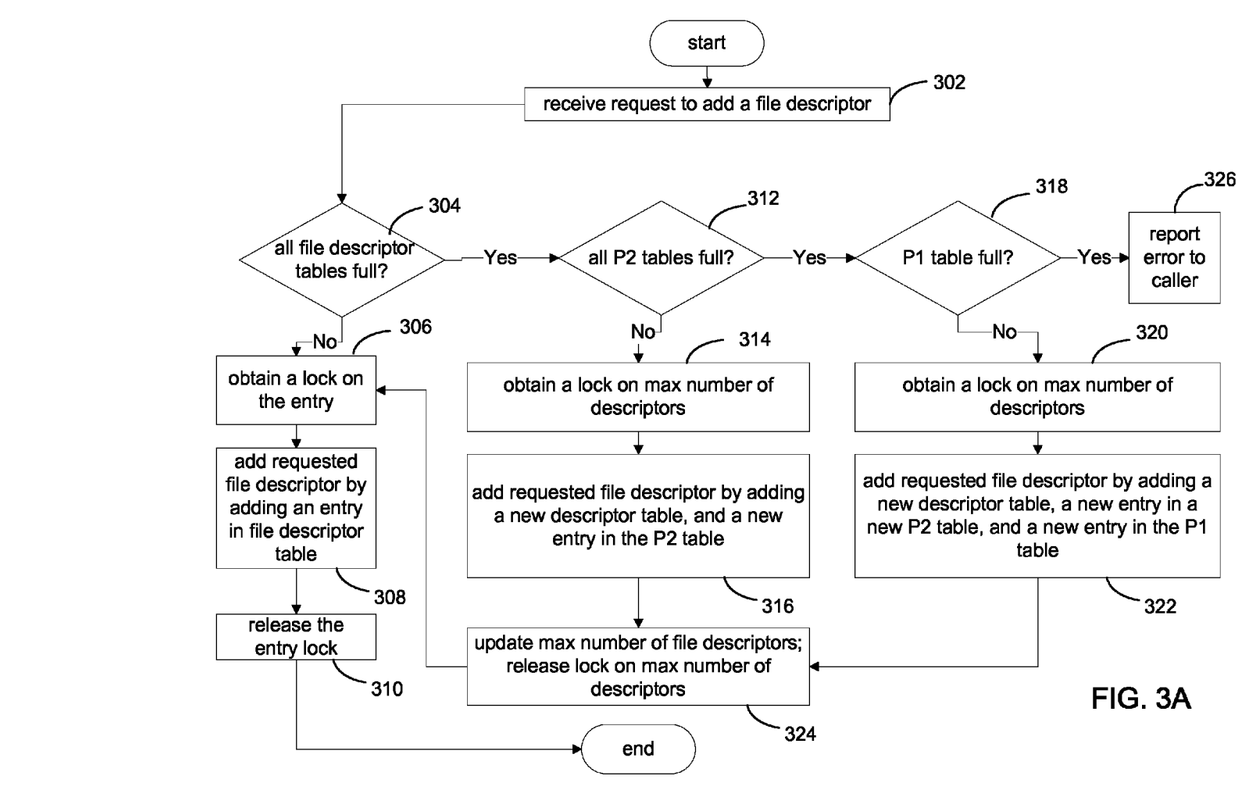
FIG. 3A depicts an example flow for updating or extending the example data structure of FIG. 2 carried out by the OS kernel.

FIG. 3A depicts an example flow for updating or extending the example data structure of FIG. 2 carried out by the OS kernel. The data structure is extended when a new file descriptor is needed and the existing structure has reached its capacity.

In step 302, the OS kernel receives a request from an operating system thread for a new file descriptor. In step 304, the OS kernel determines whether or not all of the existing file descriptor tables are full (i.e., the taken flag of all of the descriptor table entries is TRUE). An existing file descriptor table can be less than full if one or more of its entries has its taken flag set to FALSE. This can occur either because the entry has never been used or because the entry was used and then released. In the latter case, the taken flag was changed from TRUE to FALSE when the entry was released. If not full, then in step 306, the OS kernel finds an available entry in one of the existing file descriptor tables, and then attempts to obtain a lock on the found entry. A lock is obtained on an entry by first checking that the taken flag for the entry is set to FALSE and only if the check passes, setting the taken flag to TRUE. In one embodiment, the lock for the file descriptor is obtained with an atomic compare and swap instruction. Such an instruction guarantees that no other thread took ownership of the entry between the times the taken flag is found to be FALSE and setting it TRUE. If the lock is acquired, the OS kernel in step 308 updates the table by adding the file descriptor into that table entry and setting the taken flag for that entry to be TRUE. In step 310, the OS kernel releases the lock for that table entry. It should be recognized that using locks on individual entries of the descriptor tables allows multiple concurrent threads to update the existing data structure safely.

If all of the existing file descriptor tables are full, as determined in step 304, then the data structure needs to be extended. In step 312, the OS kernel determines whether all of the P2 tables are full. If not, then in step 314, the OS kernel obtains a lock on the variable containing the maximum number of descriptors for the process. In step 316, the OS kernel creates a new file descriptor table, initializes all of the entries thereof, and adds a new entry into the P2 table, the new entry in the P2 table pointing to the new file descriptor table. Then, in step 324, the OS kernel updates the value of the variable containing the maximum number of descriptors for the process and releases the lock on that variable. After step 324, the flow proceeds to steps 306, 308, and 310, which are described above.

Figure 3B:
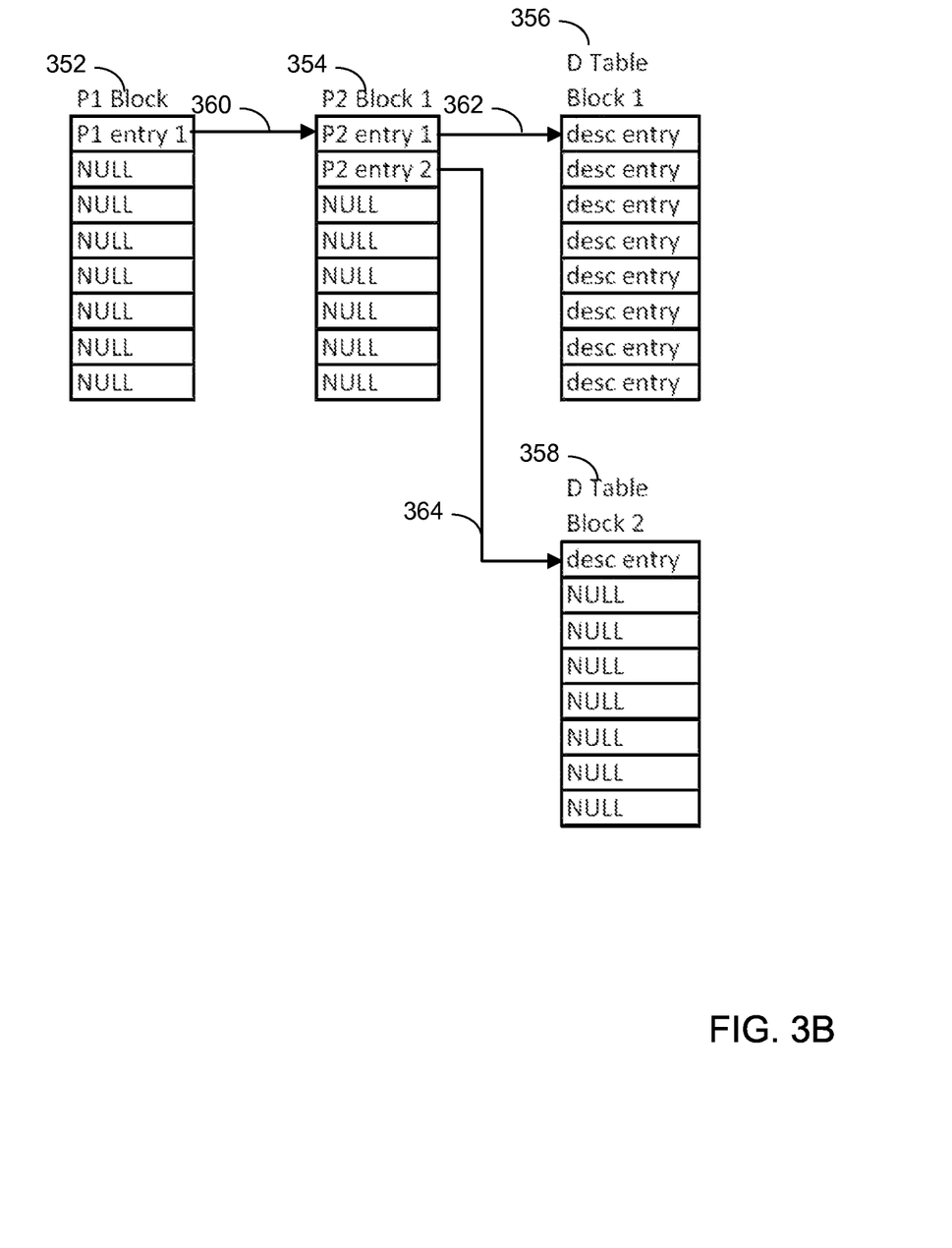
FIG. 3B depicts the change in the file descriptor data structure following an extension that includes adding a new descriptor table.

FIG. 3B depicts the change in the file descriptor data structure following the extension according to step 316. Prior to the change in the data structure, only the P1 Block 352, the P2 Block 354 and the DTable Block 1 356 were present. In the figure, P1 entry 1 is a pointer 360 to P2 Block 1 354 and P2 entry 1 is a pointer 362 to DTable Block 1 356. Because the DTable Block 1 is full and P2 Block 1 was not full, a new descriptor table DTable Block 2 was added and initialized with NULLs and an entry (P2 entry 2) in P2 Block 1 was added as a pointer 364 the new descriptor table 358. The new P2 entry (P2 entry 2) is added to the next sequential slot available in the P2 Block 1 table. Lastly, the new descriptor ("desc entry" in FIG. 3B) was entered into the first entry of the DTable Block 2 and the taken flag in the descriptor was set. The new descriptors are added to the new descriptor table 358 sequentially. That is, if another descriptor is requested, it would be placed in the next sequential entry of the new descriptor table 358.

Returning to FIG. 3A, if all of the P2 tables are full as determined in step 312, then in step 318, the OS kernel determines whether the P1 table is full. If not, then, in step 320, the OS kernel obtains a lock on the variable containing the maximum number of descriptors for the process. In step 322, the OS kernel creates a new file descriptor table and a new P2 table, initializes all of the entries of the new file descriptor table, and adds a new entry into the new P2 table and a new entry into the P1 table. The new entry in the P2 table points to the new file descriptor table, and the new entry in the P1 table points to the new P2 table. Then, in step 324, the OS kernel updates the value of the variable containing the maximum number of descriptors for the process and releases the lock on that variable. After step 324, the flow proceeds to step 306, 308, and 310, which are described above.

Figure 3C:
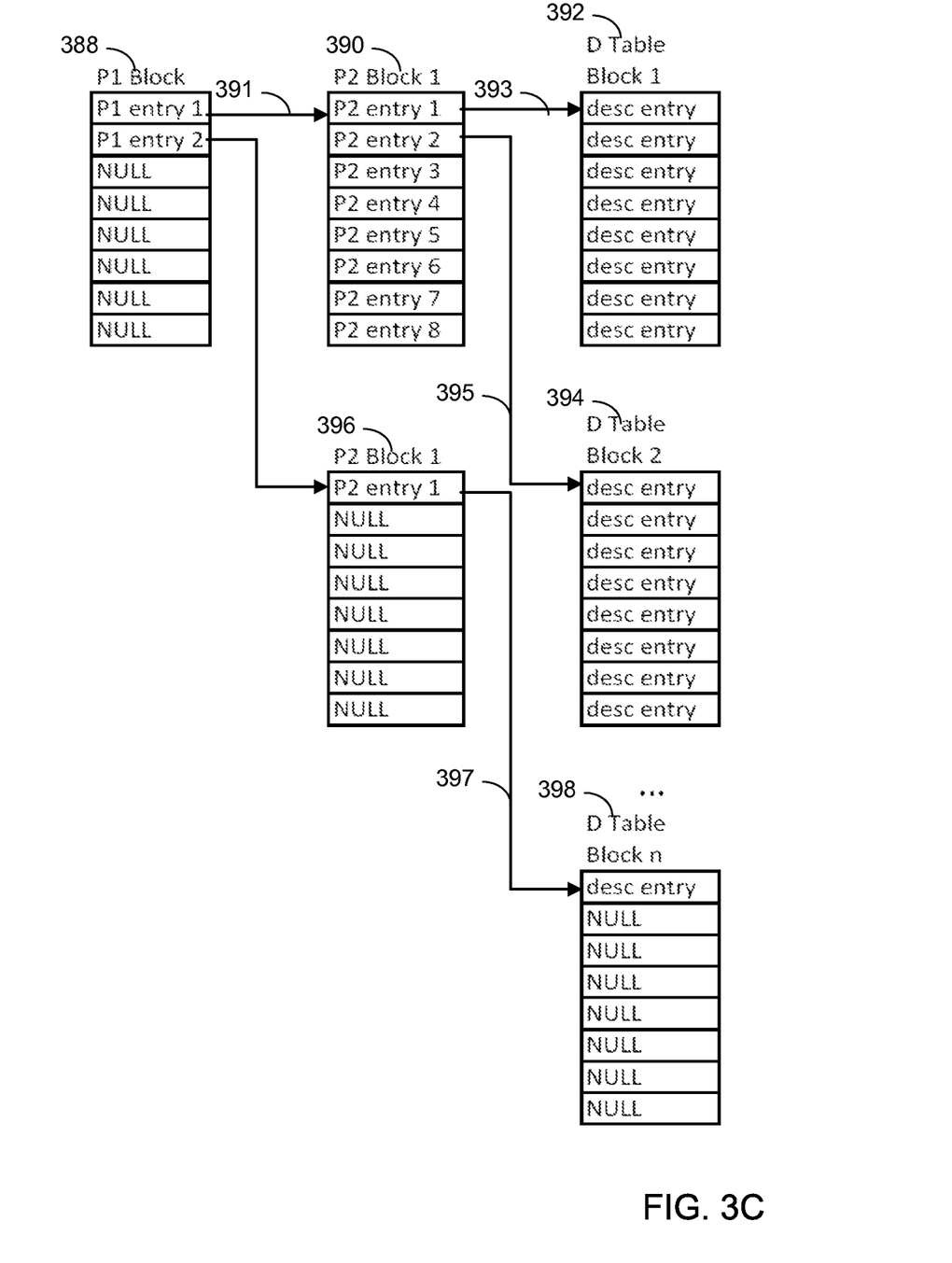
FIG. 3C depicts the change in the file descriptor data structure following an extension that includes adding a new P2 table and a new descriptor table.

FIG. 3C depicts the change in the file descriptor data structure following the extension according to step 322. Prior to the change in the data structure, P2 390 was found to be full and P1 388, P2 390, and eight descriptor tables were present (only DTable Block 1 392 and DTable Block 2 394 are shown). In the figure, P1 388 has a pointer 391 to P2 Block 1, P2 has a pointer 393 to DTable Block 1, a pointer 395 to DTable Block 2, and pointers to six additional DTable Blocks (not shown). Because P2 390 was found to be full, a new P2 table (P2 Block 1 396) is added, a new DTable Block n 398 is added, and a new pointer 397 is added to the new P2 table 396 to point to the new DTable Block n 398. Finally, the requested descriptor is added as the first entry, i.e., the next available sequential entry, to the new DTable Block n 398.

If the P1 table is full as determined in step 318 of FIG. 3A, then the data structure has reached its maximum capacity and cannot add another file descriptor at the current time. If the operating system receives a call, such as an open file call, which requires a new descriptor and the P1 table is full as determined in step 318, then the operating system reports an error to the caller in step 326 indicating that the call failed. The caller then decides how to handle the failed call. One strategy is to wait for an amount of time and try again. If during the wait time, a process completed and released its file descriptors, then retrying the call will succeed.

Figure 4:
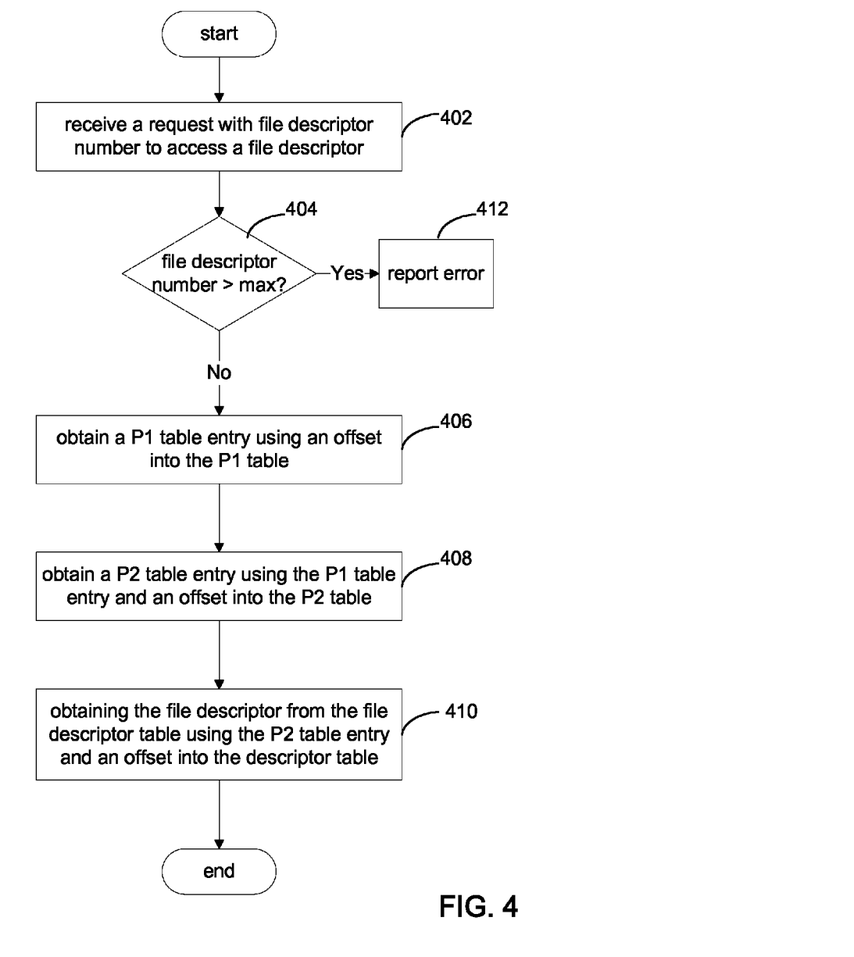
FIG. 4 depicts an example flow for accessing the example data structure.

FIG. 4 depicts an example flow for accessing the example data structure of FIG. 2 for a file descriptor. In step 402, the OS kernel receives a request by a thread or process to access a file descriptor, where the request includes the file descriptor number. Access can occur whether or not the data structure is being extended by another thread or process. In step 404, the OS kernel determines whether the requested file descriptor number is greater than the maximum number of file descriptors. If so, in step 412, an error is reported. If not, in step 406, the OS kernel obtains a P1 table entry using the base of the P1 table and a computed offset into the table. For example, if tables entries are numbered starting at 0, the sizes of all tables are eight and the file descriptor number is 21, then the offset sets are (0,2,5) for tables P1, P2 and the descriptor table, respectively. If the file descriptor number is 511, then the offsets are (7,7,7), respectively. In step 408, the OS kernel obtains a P2 pointer using the P1 table entry and a computed offset into the P2 table pointed to by the P1 table entry. In step 410, the OS kernel obtains the file descriptor from the file descriptor table using the P2 table entry and a computed offset into the file descriptor table pointed to by the P2 table entry. Because file descriptors are added to the file descriptor tables in a sequential manner as explained above, the OS kernel is guaranteed that access of the file descriptor having a file descriptor number less than the maximum number currently present cannot fail.

In summary, a system and method are described for a data structure containing file descriptors. The data structure grows as needed by adding either a new file descriptor table or a new P2 table and file descriptor table, as needed, to fulfill requests for new file descriptors. The data structure thus occupies less space than that needed for a static allocation of memory for a descriptor table and allows efficient access to the table regardless of whether or not the table is locked.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for adding file descriptor data in a memory-resident data structure for storing file descriptors for a process, the data structure including a root table and a file descriptor table that is accessed through an entry in the root table, the method comprising:

receiving a request from a thread of the process to add a file descriptor to the memory-resident data structure;

obtaining a lock on a variable containing a value that represents a maximum number of descriptors for the process;

while the lock is held, adding the file descriptor to a new file descriptor table and then updating the variable with an increased value to reflect an increase in the maximum number of file descriptors in the data structure for the process; and releasing the lock.

2. The method of claim 1, wherein said adding the file descriptor to a new file descriptor table includes:
adding another descriptor table to the memory-resident data structure as the new file descriptor table, and
adding an entry to the root table through which the added descriptor table is accessed.

3. The method of claim 2, wherein said adding the file descriptor to a new file descriptor table further includes:
prior to adding the file descriptor, initializing all entries in the added descriptor table, marking a first one of the initialized entries as taken, and then adding the file descriptor to the first one of the initialized entries.

4. The method of claim 3, further comprising:
receiving another request from a thread of the process to add another file descriptor to the memory-resident data structure; and
adding said another file descriptor to one of the initialized entries of the added descriptor table that is not taken.

5. The method of claim 1, wherein the memory-resident data structure further includes a pointer table and the pointer table is full, and said adding the file descriptor to a new file descriptor table includes:
adding another descriptor table to the memory-resident data structure as the new file descriptor table;
adding another pointer table to the memory-resident data structure as a new pointer table;
adding an entry to the added pointer table through which the added descriptor table is accessed; and
adding an entry to the root table through which the added pointer table is accessed.

6. The method of claim 5, wherein said adding the file descriptor to a new file descriptor table further includes:
prior to adding the entry to the added pointer table, initializing all entries in the added pointer table; and
prior to adding the file descriptor to the new file descriptor table, initializing all entries in the new file descriptor table, marking a first one of the initialized entries as taken, and then adding the file descriptor to the first one of the initialized entries.

7. The method of claim 1, further comprising:
while the lock is held, receiving a request from another thread of the process to access a file descriptor in the memory-resident data structure;
verifying that a file descriptor number contained in the request is less than a current value of the variable containing the maximum number of file descriptors for the process; and
obtaining the requested file descriptor from one of the file descriptor tables using the file descriptor number.

8. The method of claim 7, wherein said obtaining the requested file descriptor includes:
obtaining a root table entry using the file descriptor number to compute an offset into the root table; and
obtaining the file descriptor from a file descriptor table pointed to by the root table entry using the file descriptor number to compute an offset into the file descriptor table.

9. A computer program product stored on a non-transitory computer readable storage medium and comprising instructions that cause a computer system to perform a method for adding file descriptor data in a memory-resident data structure for storing file descriptors for a process, the data structure including a root table and a file descriptor table that is accessed through an entry in the root table, the method comprising:
receiving a request from a thread of the process to add a file descriptor to the memory-resident data structure;
obtaining a lock on a variable containing a value that represents a maximum number of descriptors for the process;
while the lock is held, adding the file descriptor to a new file descriptor table and then updating the variable with an increased value to reflect an increase in the maximum number of file descriptors in the data structure for the process; and
releasing the lock.

10. The computer program product of claim 9, wherein said adding the file descriptor to a new file descriptor table includes:
adding another descriptor table to the memory-resident data structure as the new file descriptor table, and
adding an entry to the root table through which the added descriptor table is accessed.

11. The computer program product of claim 10, wherein said adding the file descriptor to a new file descriptor table further includes:
prior to adding the file descriptor, initializing all entries in the added descriptor table, marking a first one of the initialized entries as taken, and then adding the file descriptor to the first one of the initialized entries.

12. The computer program product of claim 11, wherein the method further comprises:
receiving another request from a thread of the process to add another file descriptor to the memory-resident data structure; and
adding said another file descriptor to one of the initialized entries of the added descriptor table that is not taken.

13. The computer program product of claim 9, wherein the memory-resident data structure further includes a pointer table and the pointer table is full, and said adding the file descriptor to a new file descriptor table includes:
adding another descriptor table to the memory-resident data structure as the new file descriptor table;
adding another pointer table to the memory-resident data structure as a new pointer table;
adding an entry to the added pointer table through which the added descriptor table is accessed; and
adding an entry to the root table through which the added pointer table is accessed.

14. The computer program product of claim 13, wherein said adding the file descriptor to a new file descriptor table further includes:
prior to adding the entry to the added pointer table, initializing all entries in the added pointer table; and
prior to adding the file descriptor to the new file descriptor table, initializing all entries in the new file descriptor table, marking a first one of the initialized entries as taken, and then adding the file descriptor to the first one of the initialized entries.

15. The computer program product of claim 9, wherein the method further comprises:
while the lock is held, receiving a request from another thread of the process to access a file descriptor in the memory-resident data structure;
verifying that a file descriptor number contained in the request is less than a current value of the variable containing the maximum number of file descriptors for the process; and obtaining the requested file descriptor from one of the file descriptor tables using the file descriptor number.

16. The computer program product of claim 15, wherein said obtaining the requested file descriptor includes:
   obtaining a root table entry using the file descriptor number to compute an offset into the root table; and
   obtaining the file descriptor from a file descriptor table pointed to by the root table entry using the file descriptor number to compute an offset into the file descriptor table.

17. A computer system comprising:
   a processor; and
   a memory containing an operating system executed by the processor, the operating system containing a memory-resident data structure for storing file descriptors for a process, wherein the data structure includes a root table and a file descriptor table that is accessed through an entry in the root table, and the operating system, in response to a request from a thread of the process to add a file descriptor to the memory-resident data structure:
   obtains a lock on a variable containing a value that represents a maximum number of descriptors for the process;
   while the lock is held, adds the file descriptor to a new file descriptor table and then updates the variable with an increased value to reflect an increase in the maximum number of file descriptors in the data structure for the process; and
   releases the lock.

18. The computer system of claim 17, wherein, prior to adding the file descriptor, the operating system initializes all entries in the added descriptor table, mark a first one of the initialized entries as taken, and then add the file descriptor to the first one of the initialized entries.

19. The computer system of claim 17, wherein the memory-resident data structure further includes a pointer table and, when the pointer table is full, the operating system:
   adds another descriptor table to the memory-resident data structure as the new file descriptor table;
   adds another pointer table to the memory-resident data structure as a new pointer table;
   adds an entry to the added pointer table through which the added descriptor table is accessed; and
   adds an entry to the root table through which the added pointer table is accessed.

20. The computer system of claim 17, wherein the operating system, in response to a request that is received while holding the lock, from another thread of the process to access a file descriptor in the memory-resident data structure:
   verifies that a file descriptor number contained in the request is less than a current value of the variable containing the maximum number of file descriptors for the process; and
   obtains the requested file descriptor from one of the file descriptor tables using the file descriptor number.

* * * * *